J. A. WHITTON.
VALVE ACTUATING MECHANISM.
APPLICATION FILED JUNE 8, 1916.

1,238,608.

Patented Aug. 28, 1917.
2 SHEETS—SHEET 1.

Inventor
James A. Whitton.

by Edmund A. Strause, Atty.

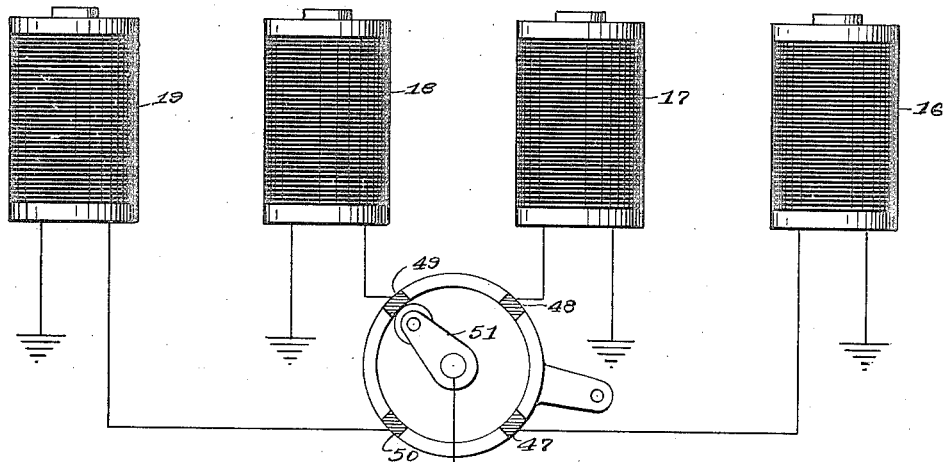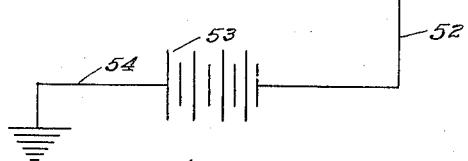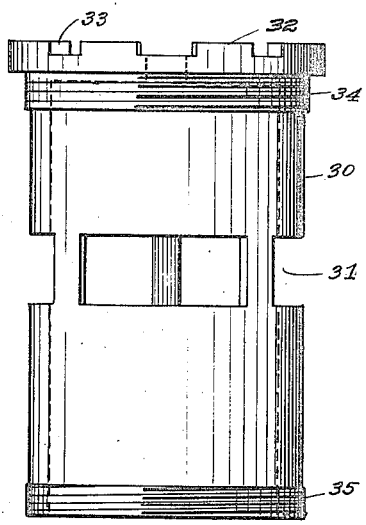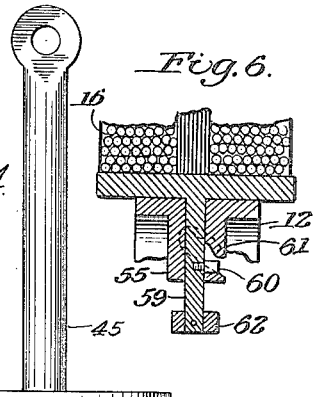

UNITED STATES PATENT OFFICE.

JAMES A. WHITTON, OF LOS ANGELES, CALIFORNIA.

VALVE-ACTUATING MECHANISM.

1,238,608.  Specification of Letters Patent.  Patented Aug. 28, 1917.

Application filed June 8, 1916. Serial No. 102,416.

*To all whom it may concern:*

Be it known that I, JAMES A. WHITTON, a citizen of the United States, residing at Los Angeles, in the county of Los Angeles and State of California, have invented new and useful Improvements in Valve-Actuating Mechanisms, of which the following is a specification.

This invention relates to a valve actuating mechanism and especially to an electro-mechanical actuating mechanism.

It is common practice to actuate valves for internal combustion engines by means of springs, cams and gearing operated from the engine crank shaft. The power consumed by such operation is considerable because of friction and other factors, thereby resulting in a lower efficiency of the engine. Where cams are used in the actuating mechanism it is inherently characteristic that an appreciable time is consumed in opening the valves. This is especially objectionable in the case of exhaust valves where an instantaneous opening is most desirable.

The object of my invention is to provide an electro-mechanical valve actuating mechanism with means for adjusting the valve travel.

I attain this object by means of the embodiment of my invention disclosed in the accompanying drawings, in which:

Fig. 3 is an enlarged elevation of a valve cage.

Fig. 4 is an enlarged elevation of a valve piston.

Fig. 5 is a wiring diagram showing the electrical connections of the electro-magnets for the valve actuating mechanism.

Fig. 6 is a vertical section partly in elevation of an electro-magnet and the valve adjusting means.

Figure 1:
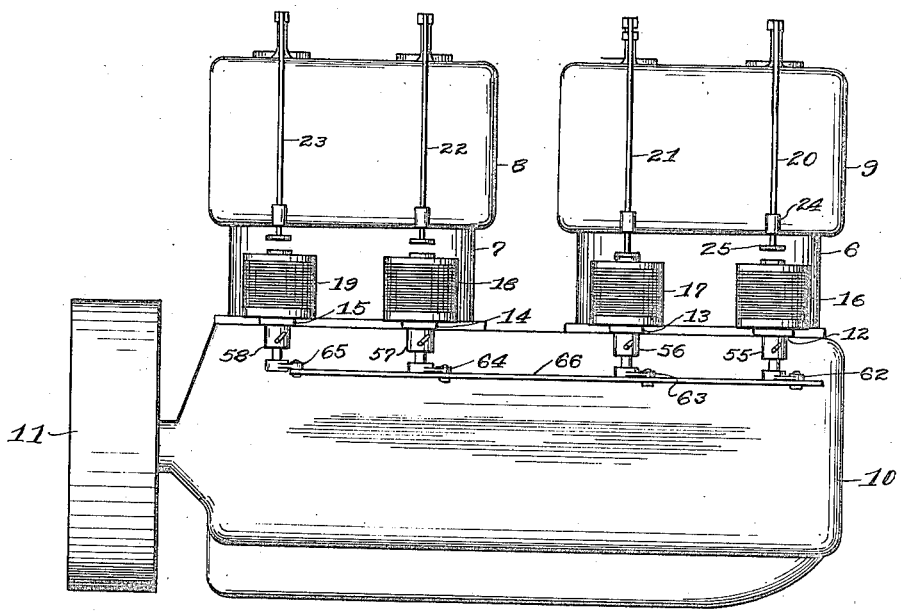
Figure 1 is an elevation of a four cylinder automobile engine.

I have shown my invention applied to an automobile engine of the T-head type with two cylinders cast *en bloc*. For the sake of clearness I have illustrated my invention as applied to the exhaust valves. The inlet valves may be operated by similar mechanism.

Referring more particularly to the drawing, 6 and 7 designate the blocks, each having two engine cylinders. These blocks are provided with heads 8 and 9 of the usual T-head form with the exhaust valves on one side and the inlet valves on the other. A crank case 10 is provided which houses the crank shaft, the latter being provided with a fly wheel 11. Extending outwardly from the engine and mounted thereon are brackets 12, 13, 14 and 15, each of similar construction and serving as a support for electro-magnets 16, 17, 18 and 19. Each of the electro-magnets is provided with a core and above the cores are disposed armatures secured to rods 20, 21, 22 and 23. As the valve mechanism is the same for each of the exhaust valves, only one will be described.

Rod 20 is secured to the engine for reciprocating movement by means of a guide 24 having an off-set tubular portion through which the rod passes. Secured to the lower end of the rod is an armature 25 which is disposed above the core of magnet 16. The upper end of the rod 20 is pivotally connected to a lever 26, which is pivotally mounted intermediate its ends upon an extension 27 of the guide 24. The arm of the T-head has a bore 28 in its upper wall. T-head engines are commonly provided with a removable plug disposed in the bore 28. I find it advisable to increase the diameter of this bore and thread it for a purpose later described. The bottom wall of the T-arm is counter-bored as designated by 29 and threaded. The counter-bore 29 is opposite to the bore 28.

Mounted within the bore 28 and the counter-bore 29 is a valve cage 30 which comprises a cylinder having ports 31 intermediate its ends. The upper end of the cage is closed by a head 32 which overhangs the body of the cage, thereby providing a flange which will engage the top wall of the T-head arm. Suitable holds 33 are provided for a spanner wrench for the insertion and removal of the cage. Threads 34 are cut upon the upper end of the cage and similar threads 35 upon the lower end so that the valve cage may be placed in position with the upper threads engaging the threads in bore 28 and the lower threads engaging the threads in counter-bore 29. Counter-bore 29 communicates by a bore 36 with the usual manifold 37.

Mounted within the valve cage 30 for reciprocating movement is a valve piston 38, which is of cylindrical form, open at its lower end and closed at its upper end. In the cylindrical wall of the piston 38 are ports 39 for registration with the ports 31 in the valve cage. I have shown piston 38 provided with piston rings 40, 41, 42 and 43.

Secured to the head of piston 38 is a stem 45 which extends through a bore in the head 32 of the valve cage. Stem 45 is pivotally connected to the end of lever 26. A balanced valve is, thereby, provided, which, if its weight is sufficient, will close due to gravity, but in order to make the closing of the valve more certain, I have mounted a coil spring 46 between the head 32 of the cage and the head of the piston.

It is evident that energization of the electro-magnets will attract the armature 25 moving the valve 38 upwardly through the linkage connecting the armature and the valve. Upon deënergizing the electro-magnets the valve will move to its lower position. In its upper portion the ports 39 in the valve and the ports 31 in the valve cage will register thereby establishing communication between the exhaust manifold 37 and the engine cylinder.

To properly actuate the valve I use a distributer diagrammatically shown in Fig. 5, and comprising segments 47, 48, 49 and 50 of electrical conducting material, each connected to a cylinder. A revolving arm 51 is provided with a contact which progressively engages the segments. The contact arm 51 is electrically connected by a conductor 52 to one terminal of a source of electrical energy, herein shown as a battery 53. The other terminal of the battery is connected to ground by conductor 54. One terminal of each of the electro-magnets is grounded. The arm 51 of the distributer is geared to the crank shaft so that as the crank shaft rotates the arm will be revolved successively making contact with the segments 47, 48, 49 and 50, thereby successively energizing the electro-magnets connected to the respective commutator segments. The distributer is so adjusted that at the beginning of the exhaust stroke of a cylinder the electro-magnets operating the exhaust valve will be energized thereby lifting the piston valve and establishing communication between the engine and the exhaust manifold. The movement of the valve is quick and a full opening results. Upon the contact arm 51 breaking contact with a segment the corresponding valve is moved to its closed position by the spring or by its own weight. The inlet valves may be operated by means of a second set of segments properly positioned to be engaged by the contact arm. This is merely a duplication of the construction described with a proper variation of the position of the segments.

Figure 2:
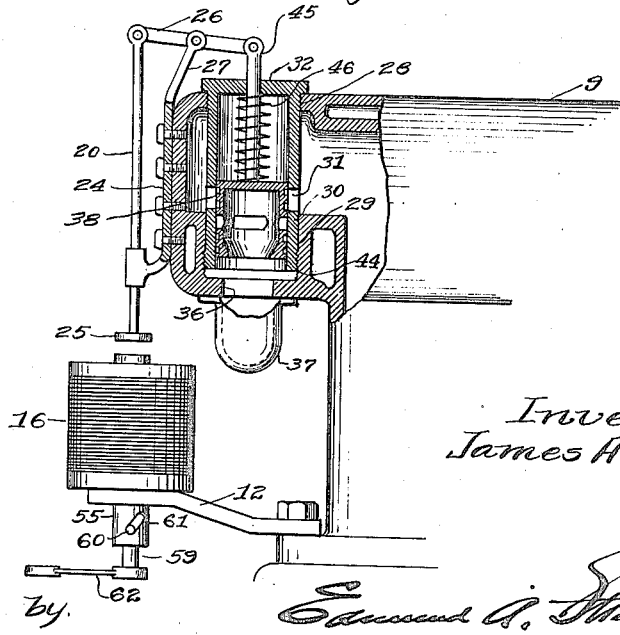
Fig. 2 is a fragmentary end elevation with parts shown in section to more clearly illustrate the valve.

In order to adjust the opening of the valves, I have shown the electro-magnets 16, 17, 18 and 19 mounted in tubular members 55, 56, 57 and 58, which are secured to the brackets 12, 13, 14 and 15 respectively. Each magnet has depending therefrom a cylindrical member designated by 59 in Fig. 2. These cylindrical members are pivotally and slidably mounted in the tubular members. An inclined slot is cut in each tubular member and a pin secured to the cylindrical member associated therewith, is disposed in the slot. In Fig. 2 the slot and pin are indicated by 60 and 61 respectively. Rotation of the cylindrical members causes the electro-magnets to be raised or lowered and thereby limits the movement of the armature and correspondingly the opening of the valve associated therewith. For convenient operation of the cylindrical members, I have secured to each of the cylindrical members an arm indicated by 62, 63, 64 and 65, and the arms are pivotally secured to a control rod 66, which may be operated from some convenient place. The construction last described is particularly valuable for the inlet valve. If the engine is run under a light load, the opening of the valves may be changed to correspond with the load.

It is obvious that in the construction where cams and gearing are used, the latter being placed upon one end of the engine shaft and fly wheel upon the other, that a torque is produced in the engine shaft which tends to shear the latter. By my construction no such torque is produced and the liability of breakage of the crank shaft is minimized.

What I claim is:

1. In an engine, a valve actuating mechanism comprising the combination of a valve, an electro-magnet, an armature for said electro-magnet, adjustable means for varying the travel of said armature, linkage connecting said armature and said valve, and a make and break device in circuit with said electro-magnet and actuated by said engine for controlling said valve.

2. In an engine, a valve actuating mechanism, comprising the combination of a valve, an electro-magnet, means to adjust the position of said electro-magnet, and thereby limit the movement of said armature, linkage connecting said armature and said valve, and a make and break device in circuit with said electro-magnet and actuated by said engine for controlling said valve.

3. In an engine, a valve actuating mechanism, comprising the combination of a valve, an electro-magnet, a support for said electro-magnet, inclined plane means interposed between said support and magnet, whereby to adjust said electro-magnet, linkage connecting said armature and said valve, and a make and break device in circuit with said electro-magnet and actuated by said engine for controlling said valve.

In witness that I claim the foregoing I have hereunto subscribed my name this 31st day of May, 1916.

JAMES. A. WHITTON.